UNITED STATES PATENT OFFICE.

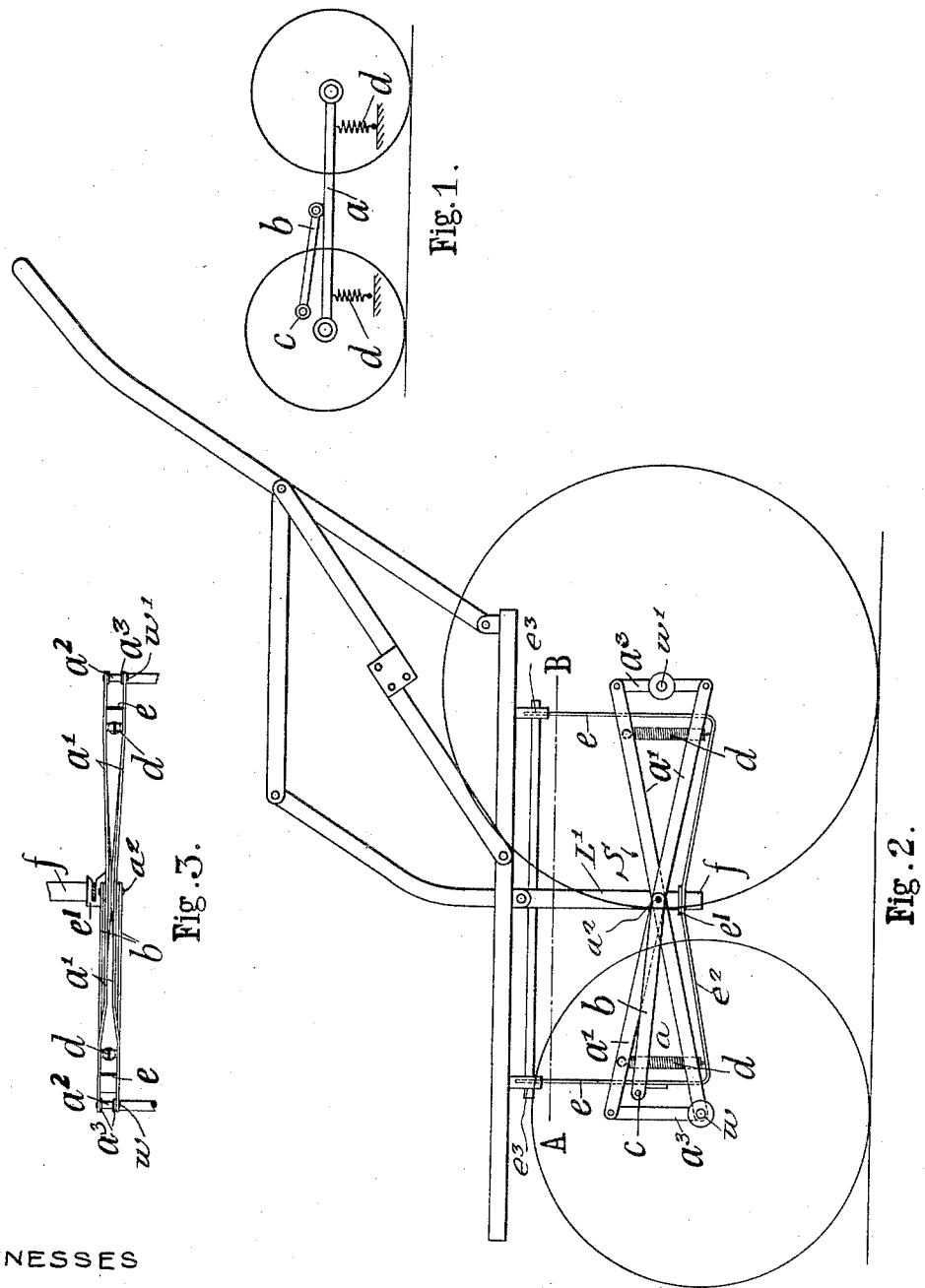

FREDERICK HAGGER HEADLEY, OF EDGBASTON, BIRMINGHAM, ENGLAND.

SPRING-MOUNTING FOR GO-CARTS.

1,081,269.

Specification of Letters Patent. Patented Dec. 9, 1913.

Application filed June 3, 1912. Serial No. 701,187.

*To all whom it may concern:*

Be it known that I, FREDERICK HAGGER HEADLEY, subject of the King of Great Britain, residing at 65 Stirling road, Edgbaston, in the city of Birmingham, England, have invented certain new and useful Improvements in Spring-Mountings for Go-Carts, of which the following is a specification.

My invention relates to improvements in children's go-carts or perambulators, and has for its object to provide improved spring mountings for children's go-carts or perambulators, whereby greater resiliency and freedom from mechanical looseness is obtained than in the mountings ordinarily employed.

The invention comprises the combination of a frame or wheel bearing member or element or equivalent to which a wheel is secured and a guide which while permitting perfectly free vertical and horizontal movements in the plane of the wheel prevents any lateral or twisting movements, and springs connecting the frame to the guide or the vehicle body; and preferably including an oscillatory or radius link or bar which provides the required constraint to the wheel bearing frame or member.

In the accompanying sheet of explanatory drawings: Figure 1 is one diagram illustrating the principle of the mounting. Fig. 2 is a side elevation of a folding baby carriage or go-cart provided with this invention; and, Fig. 3 is a section on the line A—B (Fig. 2).

The same reference letters in the different views indicate the same or similar parts.

Referring to Fig. 1, a pair of wheels is shown connected by a bar or reach $a$, of a kind included by the hereinafter used term, wheel bearing member. At its center the bar is pivoted to a radius bar $b$ which is pivoted to a fixed point $c$ and secures the bar for free oscillation upon or between the vertical parts of the side frame of the go-cart, as hereinafter more fully described. This bar together with said vertical parts or equivalent guide provides the horizontal constraint to the bar $a$, while the springs $d$ on opposite sides of the connection with the bar $b$ provide the vertical constraint.

In the application of the invention to a go-cart or perambulator as shown in Figs. 2 and 3, each pair of wheels (comprising a front wheel and a back wheel) is mounted on a light metal frame, reach, bar or wheel bearing member which may be constructed from two pairs of metal strips $a'$, the members of each pair being arranged at an angle to each other and to intersect at their middle points. The light weight and strength of such a wheel bearing member is an advantage. Short strips $a^3$ connect the ends of each pair of long strips and the two pairs of strips are connected together by distance pieces $a^2$ leaving a space between them. The reach bars or members thus formed are each arranged in conjunction with a guide or side frame $e$ (one on each side of the vehicle) comprising usually a pair of vertical bars or their equivalent pivotally secured to the underside of the seat bearing body F of the vehicle, and united at their lower ends by a horizontal portion. In practice this lower part of the side frame may be fitted with a plate $e'$ for engagement by a locking member or bail $f$. The pivotal construction of the frame $e$ and the use therewith of a locking member $f$ is to enable the structure to be folded beneath the body of the carriage. The wheels are connected to their supporting frame or bearing members in any convenient manner, as by stud axles rigidly projecting therefrom, as shown in Figs. 2 and 3. At the intersection of the members $a'$ forming the wheel bearing member, in this instance, is attached one end of a radius bar or link $b$ which at its opposite end is pivoted to a fixed point $c$ on the guide or side frame $e$. Without such restraint the wheel frame or bar would be free to move in both a horizontal and vertical direction relatively to its guide, but by such link a suitable constraint is provided without interfering with the free oscillation of both ends of the wheel frame. Connection between the wheel frame and the guides or the carriage body is effected by spiral springs $d$ arranged in tension as shown. A similar mounting is provided for each pair of wheels at opposite sides of the vehicle. By means of such mounting it is found that superior resiliency is obtained and further that the mechanical looseness which is experienced in certain known forms of spring mountings used in various types of go-carts can be avoided.

Having thus described my invention what I claim as new and desire to secure by Letters Patent, is:—

1. In spring mountings for children's go-carts the combination of wheel carrying longitudinal members on opposite sides of the vehicle with co-acting vertical guides on the vehicle which while permitting free vertical relative movements in the planes of the wheels prevent lateral or twisting movements, and springs interposed between said members and guides and providing the required constraint to said members and the wheels thereon, substantially as described.

2. In spring mountings for children's go-carts the combination of two wheel bearing frames, co-acting vertical guides on the sides of the vehicle, which guides while permitting free vertical movements in the planes of the wheels prevent lateral or twisting movements, a constraining radius bar for each said frame, and load carrying springs joining each said frame and guides, substantially as described.

3. In spring mountings for children's go-carts, the combination comprising two pairs of diagonally arranged members forming a wheel carrying frame, vertical guide bars situated between said members, a radius bar pivoted to the intersection of the members of the wheel carrying frame and to one of the vertical guide bars, and springs, substantially as described.

4. In spring mountings for children's go-carts, the combination comprising two pairs of diagonally arranged members forming a wheel carrying frame, a pair of vertical guide bars situated between said members of the wheel carrying frame and attached at their upper ends to the vehicle, a member joining the lower ends of the guide bars, a radius bar pivoted at the intersection of the said diagonally arranged members and to one of the guide bars, and springs connecting the wheel carrying frame to the horizontal member of the guide bars, substantially as described.

5. A child's go-cart comprising longitudinally disposed wheel bearing members, in combination with a seat bearing body and parallel vertically movable side frames supporting said body and themselves spring supported upon and vertically guiding respective wheel bearing members for the purposes described.

6. A child's go-cart comprising longitudinally disposed, vertically acting wheel bearing members, in combination with a seat bearing body, side frames supporting said body and vertically movable upon respective wheel bearing members, said members and guides co-acting to hold their wheels in parallel vertical planes, and load carrying springs operatively joining said members and frames for the purposes described.

7. A child's go-cart comprising longitudinally disposed, vertically acting wheel bearing members, in combination with a seat bearing body, side frames supporting said body and vertically movable upon respective wheel bearing members, said members and guides co-acting to hold their wheels in parallel vertical planes, load carrying springs operatively joining said members and frames, and means operating to longitudinally constrain said members with respect to their said frames, for the purposes described.

8. A child's go-cart comprising longitudinally disposed parallel wheel bearing members, in combination with a seat bearing body, parallel side frames supporting said body and themselves spring supported upon and vertically guiding respective wheel bearing members, and pivotal means longitudinally constraining said frames upon respective wheel bearing members, for the purposes described.

9. A child's go-cart comprising longitudinally disposed wheel bearing members swinging in vertical planes, in combination with a seat bearing body, longitudinally extended parallel side reaches supporting said body and forming vertical guides for respective wheel bearing members, and tension springs interposed between said frames and members, for the purposes described.

10. A child's go-cart comprising longitudinally extended wheel bearing members in combination with a seat bearing body, vertical guides thereon for said members respectively, said members being arranged to swing vertically on said guides, means longitudinally constraining said members with respect to said guides, and load carrying springs joining respective members and guides, for the purposes described.

11. A child's go-cart comprising parallel wheel bearing members in combination with a seat bearing body, parallel side frames supporting said body and spring mounted upon and holding respective wheel bearing members in parallelism and in vertical swinging relation to said side frames.

12. A child's go-cart comprising parallel wheel bearing members in combination with a seat bearing body, parallel side frames supporting and foldable upon said body and spring mounted upon and holding respective wheel bearing members in parallelism and in vertical swinging relation to said side frames.

13. A child's go-cart comprising longitudinally extended parallel wheel bearing members in combination with a seat bearing body, parallel guides relatively depending from and supporting said body, said members being arranged to swing vertically upon respective guides, means limiting the longitudinal movement of said members and springs interposed between said members and guides, means being provided to limit the relative vertical movements of said guides and members, for the purposes described.

14. A child's go-cart comprising a seat bearing body in combination with sub-frames each composed of vertical and horizontal parts and wheel bearing members vertically and laterally guided by respective frames, and springs normally distending said members with respect to said frames, for the purposes described.

15. A child's go-cart comprising a seat carrying body in combination with longitudinal bars, an axle rigidly projecting from the end of each said bar, parallel guides relatively depending from and supporting said body, means pivotally relating respective bars and guides and therewith adapting them to independent swinging movement in parallel vertical planes, and tension springs operatively joining respective bars and guides, for the purposes described.

16. In a child's go-cart, the combination of parallel wheel bearing bars with a seat bearing body having frame parts serving as vertical guides for said bars and vertically slidable with respect thereto and vertically acting load carrying springs attached to said bars, one for each wheel, for the purposes described.

17. A child's go-cart comprising longitudinal members each bearing two wheels, in combination with a seat bearing body, vertical supports for said body, the respective members and supports being coupled for relative swinging movement in vertical planes and load carrying springs operatively joining respective supports and members, for the purposes described.

18. A child's go-cart comprising longitudinal vertically acting members each bearing two wheels, in combination with a seat bearing body, vertical supports upon and for said body, respective supports and members being coupled to swing vertically as upon horizontal pivots and a load carrying spring for each wheel operatively joining respective supports and members, for the purposes described.

19. A child's go-cart comprising a seat bearing body in combination with front and rear wheels, parallel bars each bearing and joining a front and a rear wheel, front and rear guides on said body whereon said bars are vertically movable and load carrying springs at the ends of said bars, for the purposes described.

20. A child's go-cart comprising a seat bearing body in combination with front and rear wheels, parallel bars each bearing and joining a front and a rear wheel, front and rear guides on said body whereon said bars are vertically movable, load carrying springs at the ends of said bars, and means longitudinally constraining said bars with respect to their guides, for the purposes described.

21. A child's go-cart comprising a body frame in combination with two part side frames foldably attached to said body frame and each carrying two wheels, the parts of each side frame being joined by springs which normally distend them in their common plane, for the purposes described.

22. A child's go-cart comprising a seat bearing body in combination with longitudinally extended vertical side frames, bars of greater length than said frames having their ends thereby guided and held in vertical planes, means longitudinally constraining respective frames and bars, and tension springs at the ends of said bars, for the purposes described.

23. In a child's go-cart, a seat bearing body, a sub-frame at each side thereof, wheels associated with said sub-frames, axles upon which the wheels are mounted and a structure carried by each sub-frame retaining the axles in parallelism and permitting an independent up and down movement thereof in response to load changes.

24. In a child's go-cart, a seat bearing body, a pivoted sub-frame at each side thereof foldable beneath the cart, spring-mounted wheel axles carried by the sub-frames and means retaining the axles in rigid parallelism.

25. In a child's go-cart, a seat bearing body, a foldable sub-frame structure at each side thereof, two spring-mounted wheel axles carried by each said sub-structure and means retaining the axles in parallel relation.

In testimony whereof I have signed my name to this specification in the presence of two subscribing witnesses.

FREDERICK HAGGER HEADLEY.

Witnesses:
 JOHN MORGAN,
 FRANCIS MALPAS.

---

Copies of this patent may be obtained for five cents each, by addressing the "Commissioner of Patents, Washington, D. C."